No. 885,091. PATENTED APR. 21, 1908.
J. L. SINCLAIR.
SETTING PLANTS.
APPLICATION FILED JULY 12, 1907.

2 SHEETS—SHEET 1.

Inventor:
John L. Sinclair
By Alexander A. Dowell
Attorneys

Witnesses
H. E. Fowler
James R. Mansfield

No. 885,091. PATENTED APR. 21, 1908.
J. L. SINCLAIR.
SETTING PLANTS.
APPLICATION FILED JULY 12, 1907.
2 SHEETS—SHEET 2.
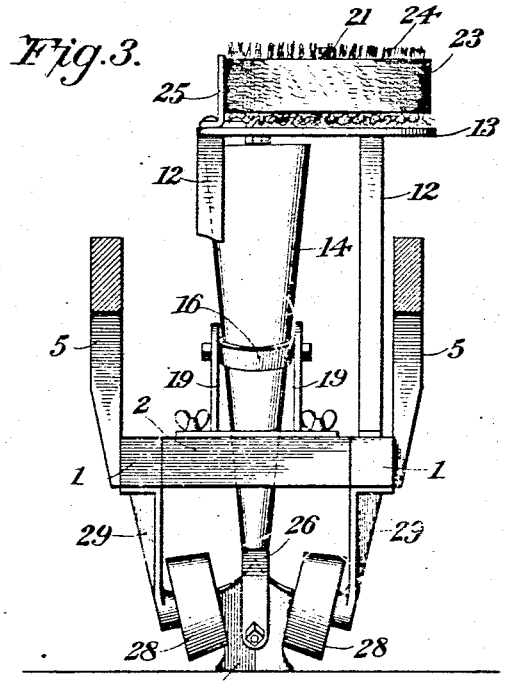
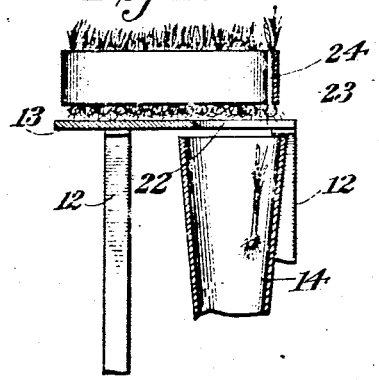
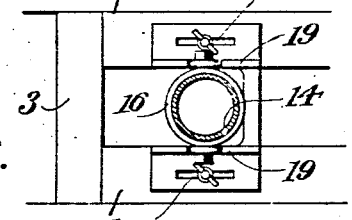
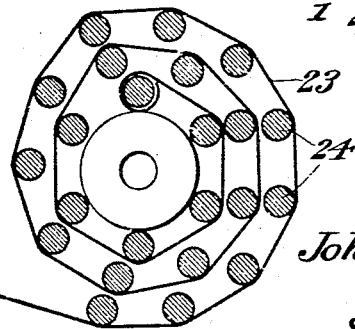
Inventor:
John L. Sinclair
By Alexander Dowell
Attorneys

UNITED STATES PATENT OFFICE.

JOHN L. SINCLAIR, OF SAN ANTONIO, TEXAS.

SETTING PLANTS.

No. 885,091.  Specification of Letters Patent.  Patented April 21, 1908.

Application filed July 12, 1907. Serial No. 383,502.

*To all whom it may concern:*

Be it known that I, JOHN L. SINCLAIR, of San Antonio, in the State of Texas, have invented certain new and useful Improvements in Setting Plants; and I hereby declare that the following is a full, clear, and exact description thereof, reference being had to the accompanying drawings, which form part of this specification.

The present invention is in the nature of an improved machine for setting plants and embodies novel means for handling the young plants whereby the same are dropped at the required intervals and set in a perfectly straight row which admits of subsequent close and quick cultivation.

The primary object of the invention is to design a simple and efficient plant setting machine which is positive in its operation and handles the plants in such a manner as to insure their rapid and uniform growth.

With this object in view the plant setting mechanism embodies essentially a coiled flexible band designed to retain the plants between its convolutions, and means for unwinding the band to drop the plants successively into the furrow.

For a full understanding of the invention and the merits thereof and also to acquire a knowledge of the details of construction, reference is to be had to the following description and accompanying drawings, in which—

Figure 1:
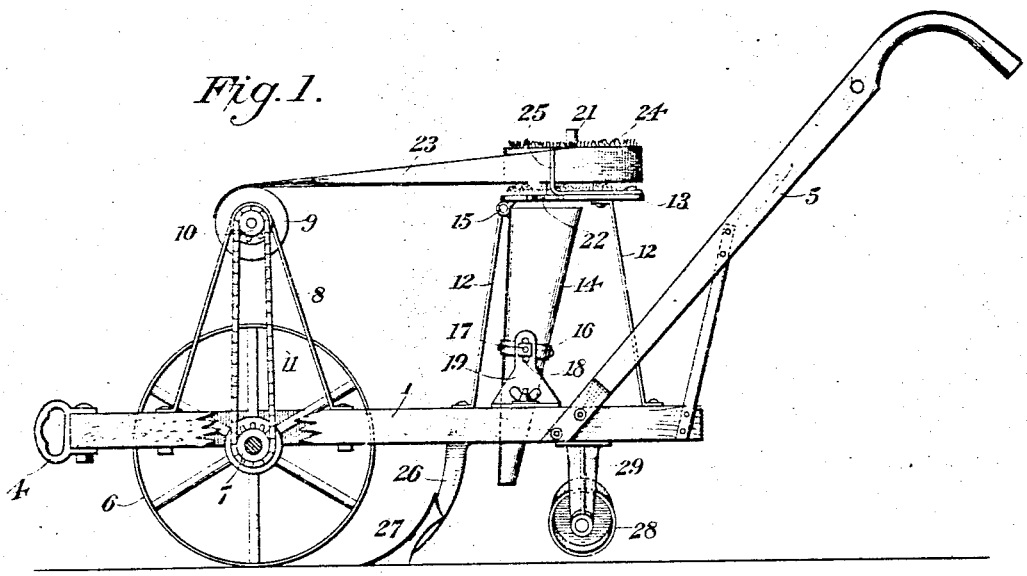
Figure 2:
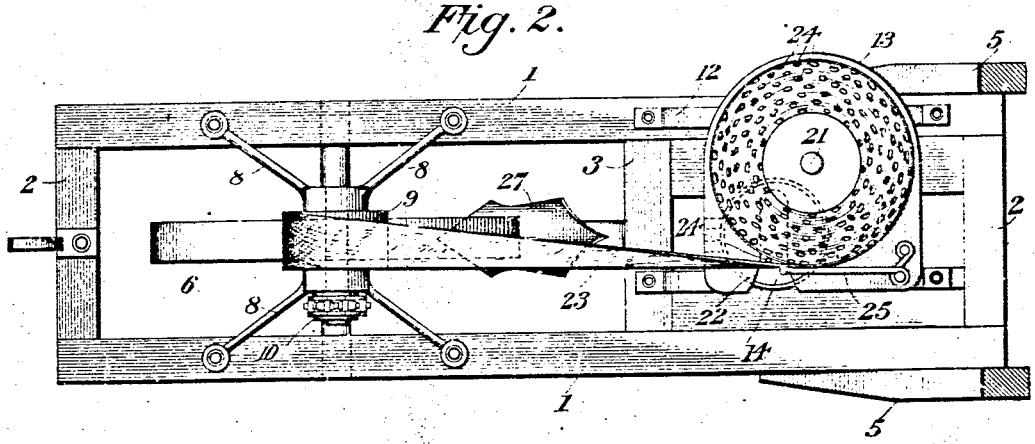

Figure 1 is a side elevation of a plant setting machine embodying the invention, portions being broken away. Fig. 2 is a top plan view of the machine. Fig. 3 is a rear end view of the machine, parts being removed. Fig. 4 is a vertical sectional view through the upper portion of the hopper. Fig. 5 is a horizontal sectional view through the hopper. Fig. 6 is an enlarged plan view of the coiled flexible band, showing the manner of retaining the plants thereby.

Corresponding and like parts are referred to in the following description and indicated on all the views of the drawings by the same reference characters.

The plant setting mechanism itself is mounted upon a main frame which may be of any desired construction and is shown in the present instance as comprising the spaced longitudinal side-bars 1 connected by the end cross-bars 2 and the intermediate cross-bar 3. A clevis 4 may be applied to the forward end of the machine while the rear portion of the frame is provided with suitable handles 5. Journaled between the side bars at the front of the main frame is a drive-wheel 6 having a sprocket-wheel 7 keyed upon or otherwise made rigid with its shaft. Standards 8 project upwardly from the side-bars 1 upon each side of the drive-wheel 6, and a drum or reel 9 is journaled between the upper portions of the said standards.

A second sprocket wheel 10 is rigid with the reel 9 and a belt or chain 11 connects the said sprocket-wheel 10 with the before mentioned sprocket-wheel 7 rigid with the drive-wheel. It will thus be clearly apparent that when the machine is in operation motion is transmitted to the reel 9 from the drive-wheel 6 through the medium of the sprocket-wheels and the chain 11.

A hopper supporting frame projects upwardly from the rear portion of the main frame and comprises the brackets 12 carrying a plate 13 at their upper extremities. The hopper 14 gradually tapers toward the lower end which is shown as projecting downwardly between the intermediate cross-bar 3 and the rear cross-bar 2 of the main frame, the upper and flared end of the said hopper having one edge thereof hinged or pivotally connected as indicated at 15 to the hopper supporting frame. A band 16 fits around an intermediate portion of the hopper and is provided upon its opposite sides with the lateral projections 17 received within vertical slots 18 in side-plates 19. It will be observed that the lower edges of the said side-plates 19 are extended laterally and adjustably connected to the side-bars 1 by a pin and slot connection 20. This construction admits of the hopper 14 being swung upon its hinged connection 15 and clamped at any desired inclination according to the nature of the soil or the plants being operated upon.

The plate 13 is provided at approximately its central portion with an upwardly projecting stub-shaft 21, and is also formed with a feed-opening 22. A band 23 of canvas or other suitable flexible material is designed to be coiled upon itself and placed upon the stub-shaft 21, the young plants indicated at 24 being held between the various convolutions of the coil. In the operation of the machine the free end of the band 16 is attached to the reel and is wound upon the same as the machine passes over the field. The feed-opening 22 in the plate 13 is located over the mouth of the hopper 14 and directly under the point at which the plant retaining coil is unwound, whereby as the plants are released successively due to the unwinding of the coil, they are delivered into the hopper.

In order to prevent the interior of the coil from becoming loose and prematurely releasing the plants a spring-arm 25 is utilized which presses against the coil at the point where it unwinds.

The furrow opener is located just in front of the discharge end of the hopper and comprises a plow-standard 26 projecting downwardly from the main frame and having a shovel 27 secured thereto. After the plants have been deposited in the furrow, earth is compacted around the stalks by the covering-rollers 28 operating upon both sides of the plants and journaled upon brackets 29 extending downwardly from the main frame.

From the foregoing description it will be apparent that as the machine travels across the field the flexible band 16 will be wound upon the reel 9 and the young plants successively dropped into the furrow through the hopper 14 as the plant retaining coil is unwound, the furrow being opened by the machine just before the plants are deposited therein and closed immediately after.

Having thus described the invention, what is claimed as new is:

1. A plant setting machine comprising a plant retaining band, a hopper, and means whereby the plants are deposited in the hopper as the band is moved thereover.

2. A plant setting machine comprising a coiled band designed to retain plants between its convolutions, and means for unwinding the coil to drop the plants.

3. A plant setting machine comprising a coiled band designed to retain plants between its convolutions, means for preventing the interior of the coil from becoming loose, and means for unwinding the coil to drop the plants.

4. A plant setting machine comprising a coiled band designed to retain plants between its convolutions, means for unwinding the coil to drop the plants, and a spring-arm bearing against the coil to prevent the interior thereof from becoming loose.

5. A plant setting machine comprising a plate having a feed opening therein, a plant retaining band, means for moving the band over the plate, and means whereby the plants are dropped through the feed opening as the band is moved over the plate.

6. A plant setting machine comprising a plate having a feed opening therein, a coiled band mounted upon the plate and designed to retain plants between its convolutions, and means for unwinding the coil, the plants being dropped through the feed opening as the coil is unwound.

7. A plant setting machine comprising a plate having a feed opening therein, a coiled band mounted upon the plate and designed to retain plants between its convolutions, means for unwinding the coil to drop the plants through the feed opening, and a spring-arm engaging the coil to prevent the interior of the same from becoming loose.

8. A plant setting machine comprising a coiled band designed to retain plants between its convolutions, the plants being dropped successively as the coil is unwound, a reel engaging the free end of the coil, and means for turning the reel to unwind the coil.

9. A plant setting machine comprising a frame, a coiled band carried by the frame and designed to retain plants between its convolutions, a reel carried by the frame and engaging the free end of the said band, a drive-wheel mounted upon the frame, and means for transmitting motion from the drive-wheel to the reel to unwind the plant retaining coil and release the plants.

10. A plant setting machine comprising a frame, a hopper carried by the frame, a coiled band located over the hopper and designed to retain plants between its convolutions, and means for automatically unwinding the coil as the frame is advanced over the field, the plants being dropped successively into the hopper as the coil is unwound.

11. A plant setting machine comprising a frame, a hopper carried by the frame, a plate mounted over the hopper and provided with a feed opening, a coiled band mounted upon the plate and designed to retain plants between its convolutions, the plants being dropped through the feed opening into the hopper as the coil is unwound, and means for automatically unwinding the coil as the frame is advanced over the field.

12. A plant setting machine comprising a frame, a hopper carried by the frame, a plate located over the hopper and provided with a feed opening, a coiled band mounted upon the plate and designed to retain plants between its convolutions, the plants being dropped into the hopper through the feed opening as the coil is unwound, a reel engaging an end of the band and carried by the frame, and means for automatically turning the reel to unwind the coil as the machine is advanced over the field.

13. A plant setting machine comprising a frame, a hopper carried by the frame, means for delivering plants into the hopper and means for setting the hopper at any desired inclination.

14. A plant setting machine comprising a main frame, a hopper supporting frame carried by the main frame, a hopper hinged to the hopper supporting frame, means for clamping the hopper at the desired inclination, and means for feeding plants into the hopper.

15. A plant setting machine comprising a frame, a hopper carried by the frame, a coiled band mounted over the hopper and designed to retain plants between its convolutions, means for automatically unwinding the coil to drop the plants into the hopper as the machine is advanced over the field, a furrow opener mounted upon the frame in advance of the hopper, and covering rollers carried by the frame in rear of the hopper.

In testimony that I claim the foregoing as my own, I affix my signature in presence of two witnesses.

JOHN L. SINCLAIR.

Witnesses:
J. M. TAYLOR,
W. LONGINO.